J. GOLDBERG.
COOKING UTENSIL.
APPLICATION FILED MAY 4, 1916.
1,246,908.
Patented Nov. 20, 1917.
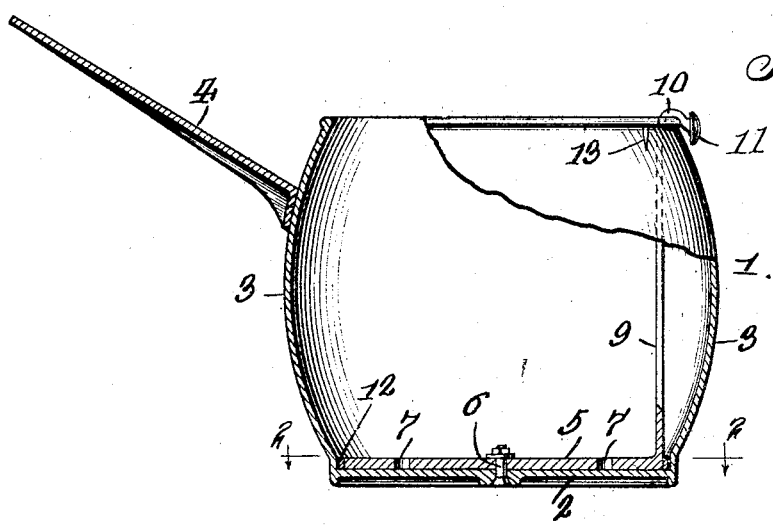
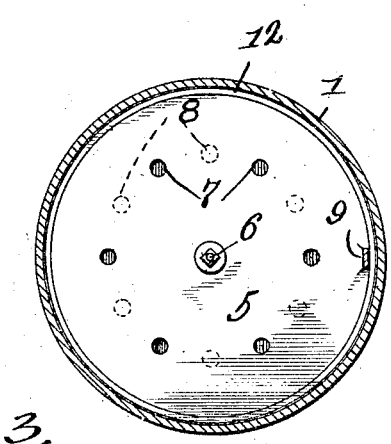
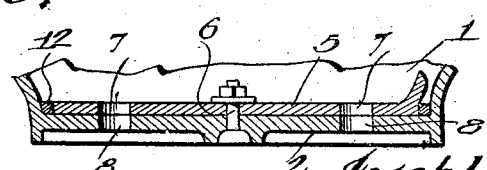
WITNESSES
INVENTOR
Joseph Goldberg
BY
ATTORNEY

UNITED STATES PATENT OFFICE.

JOSEPH GOLDBERG, OF NEW YORK, N. Y.

COOKING UTENSIL.

1,246,908.     Specification of Letters Patent.     Patented Nov. 20, 1917.

Application filed May 4, 1916. Serial No. 95,481.

*To all whom it may concern:*

Be it known that I, JOSEPH GOLDBERG, a citizen of the United States, residing at New York, in the county of New York and State of New York, have invented certain new and useful Improvements in Cooking Utensils, of which the following is a specification.

This invention has reference to a cooking utensil, and particularly to a utensil used for boiling vegetables, which embodies means, whereby when the contents of the same are completely cooked, the boiling liquid may be drained from the same without resorting to the disagreeable and dangerous operation of pouring the liquid therefrom.

Another object is the provision of a utensil having a circular plate disposed within the utensil to rest upon the bottom thereof, said plate rotatably secured to said bottom and provided with apertures adapted to be moved into alinement with apertures formed in the bottom of the utensil, whereby the liquid contents of the same may be drained off.

With these and other objects in view the invention consists in the construction and combination of the various parts as will be hereinafter more fully described and pointed out in the appended claim.

In the drawings:

Figure 1 is a vertical section of my cooking utensil partly in elevation.

Fig. 2 is a section upon the line 2—2 of Fig. 1 looking in the direction of the arrow.

Fig. 3 is a vertical section through the lower portion of the utensil showing the perforations of the plate registering with the perforations of the bottom of the utensil.

The numeral 1 indicates a cooking utensil having a bottom 2, sides 3, and a handle 4. A circular plate 5 is disposed within the utensil and rests upon the bottom 2 thereof, and is rotatably secured to the said bottom by means of a rivet 6. Perforations 7 extending through said plate are adapted to be alined with perforations 8 formed in the bottom of the utensil by rotating the said plate. In order to rotate the plate a vertical handle 9 is formed integrally with the said plate and is bent over the upper edge of the utensil, as at 10. A knob or button 11 is provided on the bent end of the handle which is adapted to be engaged by the fingers. As will be noted a suitable mark 13 is provided to mark the point at which the perforations 7 and 8 are in alinement, so that by merely moving the knob 11 to register with said mark the liquid contents of the utensil are allowed to escape therefrom. It will be seen upon inspection of the drawings that the periphery of the plate 5 is spaced away from the sides of the receptacle, and the intervening space is filled by a rubber packing ring 13.

In use it will be appreciated that the plate 5 is adapted to serve as a bottom to retain the contents of the utensil, when its perforations are not in alinement with the perforations in the bottom 2 thereof, and that the said liquid contents are prevented from escaping between the periphery of the plate and the sides of the receptacle by means of the rubber packing ring 13. When however, the perforations 7 and 8 are alined in the manner described in the preceding paragraph the boiling, steaming liquid is allowed to drain off, whereupon the solid contents of the utensil may be readily removed therefrom.

While, it will be seen from the description taken in connection with the drawings, that I have provided a device clearly efficient and operable for the purpose described, I do not claim the exact construction shown therein, but reserve the right to make certain minor changes and alterations as will not depart from the spirit and scope of the appended claim.

I claim:

A cooking utensil including a receptacle having a bottom provided with a reinforced central portion, a pivot member extending through said reinforced central portion, a plate mounted upon said pivot member, said bottom being provided with perforations, said plate being provided with perforations adapted to register at times with the perforations of said bottom, a handle formed with said plate and extending upwardly from the periphery thereof, the upper extremity of said handle being bent outwardly over the edge of the utensil, a knob formed on said end of the handle outwardly of said utensil, whereby said plate may be rotated to move the perforations thereof into and out of registration with the perforations of said bottom and means on the upper edge of said utensil to indicate the proper position of said handle to cause registration of the openings of said plate with the openings of said bottom.

In testimony whereof I affix my signature in presence of two witnesses.

JOSEPH GOLDBERG.

Witnesses:
 JACOB HOROWITZ,
 HERMAN BRAUN.

Copies of this patent may be obtained for five cents each, by addressing the "Commissioner of Patents, Washington, D. C."